United States Patent [19]
Oh

[11] Patent Number: 5,819,547
[45] Date of Patent: Oct. 13, 1998

[54] REFRIGERATOR HAVING A WATER DISPENSING SYSTEM IN WHICH A WATER RESERVOIR IS AUTOMATICALLY REFILLED WHEN ITS WATER LEVEL IS LOW

[75] Inventor: Gil-Soo Oh, Suwon, Rep. of Korea

[73] Assignee: Samsung Electronics Co., Ltd., Suwon, Rep. of Korea

[21] Appl. No.: 757,552

[22] Filed: Nov. 27, 1996

[30]      Foreign Application Priority Data

Dec. 12, 1995 [KR] Rep. of Korea ............... 95-48773

[51] Int. Cl.⁶ ................................................. F25D 17/00
[52] U.S. Cl. ............................ 62/188; 62/339; 62/389; 141/DIG. 1
[58] Field of Search ................. 141/DIG. 1; 62/188, 62/338, 339, 389, 394

[56]             References Cited
            U.S. PATENT DOCUMENTS

| | | | |
|---|---|---|---|
| 2,495,878 | 1/1950 | Tull | 62/339 |
| 3,495,612 | 2/1970 | Moreland, II et al. | 62/394 |
| 3,699,776 | 10/1972 | La Raus | 62/394 |
| 4,362,033 | 12/1982 | Young | 68/207 |
| 5,003,790 | 4/1991 | Goupil | 62/389 |
| 5,135,645 | 8/1992 | Sklenak | 62/339 |
| 5,495,725 | 3/1996 | Middlemiss | 62/389 |
| 5,502,978 | 4/1996 | Field | 62/389 |

*Primary Examiner*—William E. Tapolcai
*Attorney, Agent, or Firm*—Burns, Doane, Swecker & Mathis, L.L.P.

[57]              ABSTRACT

A refrigerator includes a water dispensing system which includes a receptacle removably disposed within a refrigerating compartment of the refrigerator. A valved feed duct extends into the refrigerator for supplying fresh water to the receptacle when the water level in the receptacle falls below a predetermined level. An ultrasonic water level detector determines when the water level falls below the predetermined level and sends a signal to a controller which then opens the valved feed duct.

7 Claims, 5 Drawing Sheets

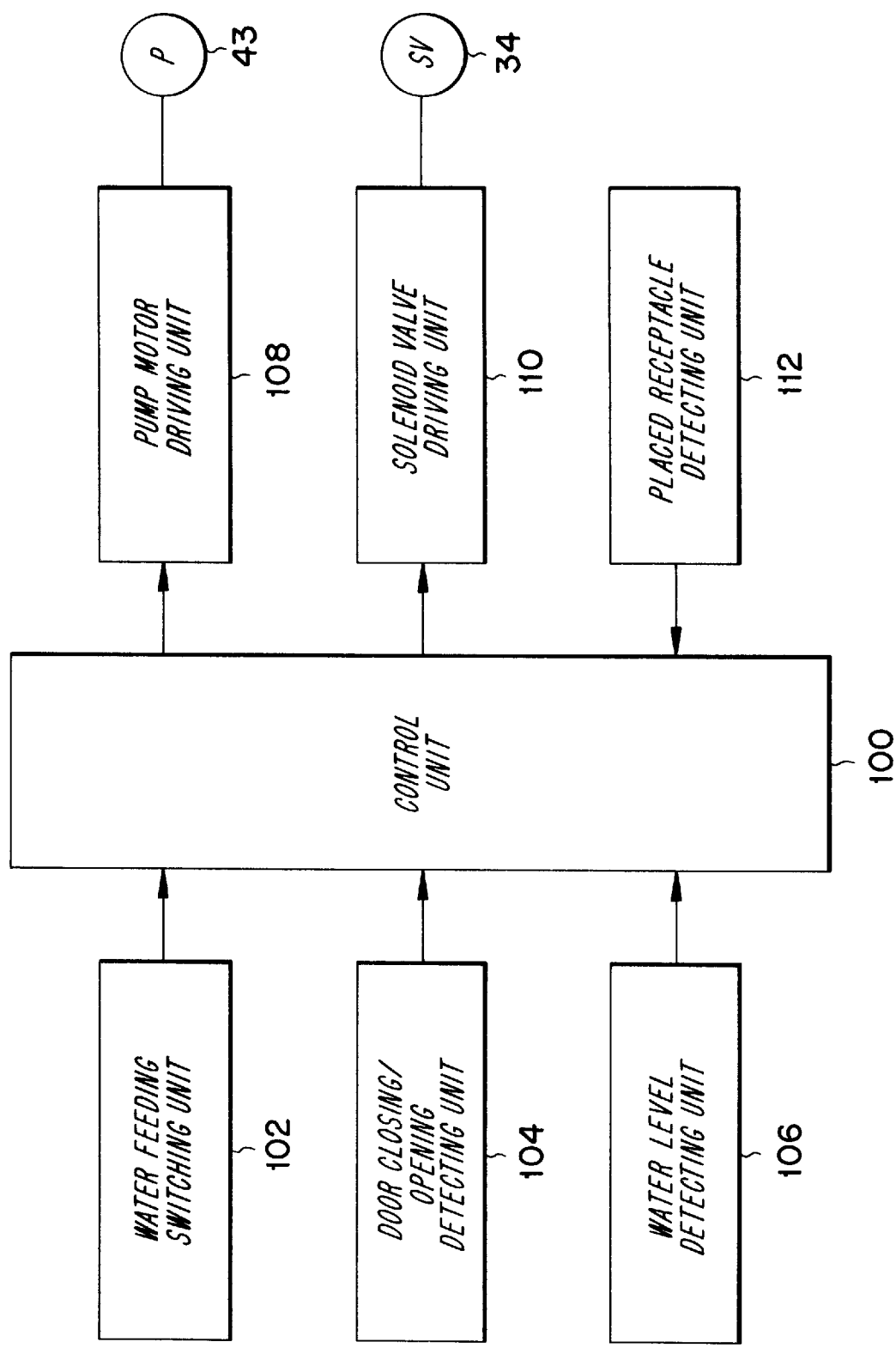

REFRIGERATOR HAVING A WATER DISPENSING SYSTEM IN WHICH A WATER RESERVOIR IS AUTOMATICALLY REFILLED WHEN ITS WATER LEVEL IS LOW

BACKGROUND OF THE INVENTION

1. Field of the Invention

The present invention relates to an automatic water filling apparatus in which a water receptacle is automatically filled with an amount of the water enough to reach a desired water level.

2. Description of the Prior Art

Recently, there has been provided a refrigerator in which cold water can be dispensed outside the refrigerator without opening the door of the refrigerator. As shown in FIG. 1, a main body 1 of this refrigerator comprises at the front portion thereof doors 2 and 3 for closing and opening a freezing compartment and a refrigerating compartment, respectively, wherein the door 3 for the refrigerating compartment is provided at one side thereof with a water dispenser 4.

The water dispenser 4, as shown in FIG. 2, includes a water discharge outlet 5a for discharging the cold water from the recessed portion of the door 3, a cylinder 5 formed through the door 3, and a receiving portion 5b positioned over the cylinder 5. The cylinder 5 has a slide member 7 therein resiliently biased by means of a spring 8b, in which the slide member 7 is adapted to be horizontally slid due to the movement of a lever 6 hinged at the front portion of the door 3. And, the receiving portion 5b has a reservoir 9 for storing the cold water W positioned thereon.

The reservoir 9 has a cover 10 and a lower cap 11 coupled on upper and lower sides thereof, respectively, and a valve body 12 resiliently biased by means of a spring 8a such that the reservoir 9 is able to ascend or descend according to the operation of the slide member 7. The valve body 12 has at its upper portion a valve plate 13 coupled thereto and for controlling the flow of the cold water W by closing and opening the upper portion of the lower cap 11 depending upon the ascending or descending operation of the valve body 13.

Thus, in case the reservoir 9 containing a certain amount of the cold water therein is placed in position within the receiving portion 5b formed on an upper portion of the cylinder 5, the lower part of the valve body 12 coupled to the inner side of the lower cap 11 descends, thus causing the upper portion of the lower cap 11 to be blocked. Accordingly, the cold water W in the reservoir 9 is no longer discharged.

At this time, the pivoting operation of the lever 6 made by the placement of a cup below the water discharge outlet 5a, which is illustrated by two-dotted line in drawing, causes the slide member 7 to withdraw backward, resulting in the ascending of the valve body 12 and valve plate 13. Accordingly, the ascending of the valve plate 13 the upper portion of the lower cap 11 is opened so that the cold water W can be discharged into the cup C through the lower cap 11, cylinder 5 and water discharge outlet 5a.

However, there is a problem in that cold water might not be available from the conventional water filling apparatus due to a lack of means for detecting the absence of the cold water in the reservoir. Furthermore, for filling the conventional water filling apparatus with the cold water it is required to open/close the door of the refrigerator, which can cause a loss of the cold air from the refrigerator.

SUMMARY OF THE INVENTION

Therefore, it is an object of the present invention to provide an automatic water filling apparatus which is responsive to the detected water level of cold water stored in a water receptacle to automatically fill the water receptacle with water.

The above objects are accomplished by an automatic water filling apparatus for a refrigerator employing a receptacle receiving chamber formed by partially partitioning a refrigerating compartment of the refrigerator for accommodating the receptacle, the automatic water filling apparatus comprising:

water level detecting means for detecting a water level of cold water stored in the water receptacle;

a water feed duct coupled to a water main external to the refrigerator for supplying a tap water to the receptacle;

a closing/opening valve installed on the water feed duct; and control means responsive to a sensing signal provided from the water level detecting means for determining the corresponding water level of the receptacle.

BRIEF DESCRIPTION OF THE DRAWINGS

Other objects and aspects of the invention will become apparent from the following description of embodiment with reference to the accompanying drawings in which:

FIG. 5 is a diagram showing a control circuit for the water filling apparatus according to the present invention.

DETAILED DESCRIPTION OF A PREFERRED EMBODIMENT

A preferred embodiment of the present invention will now be described in detail in accordance with the accompanying drawings.

Figure 1:
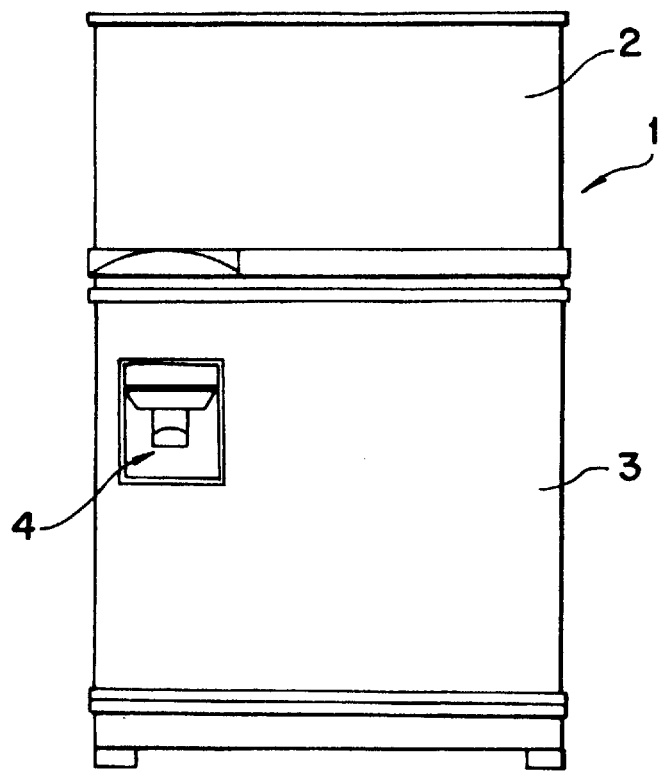
FIG. 1 is a schematic vertical elevation showing a refrigerator having a conventional water dispenser.
Figure 2:
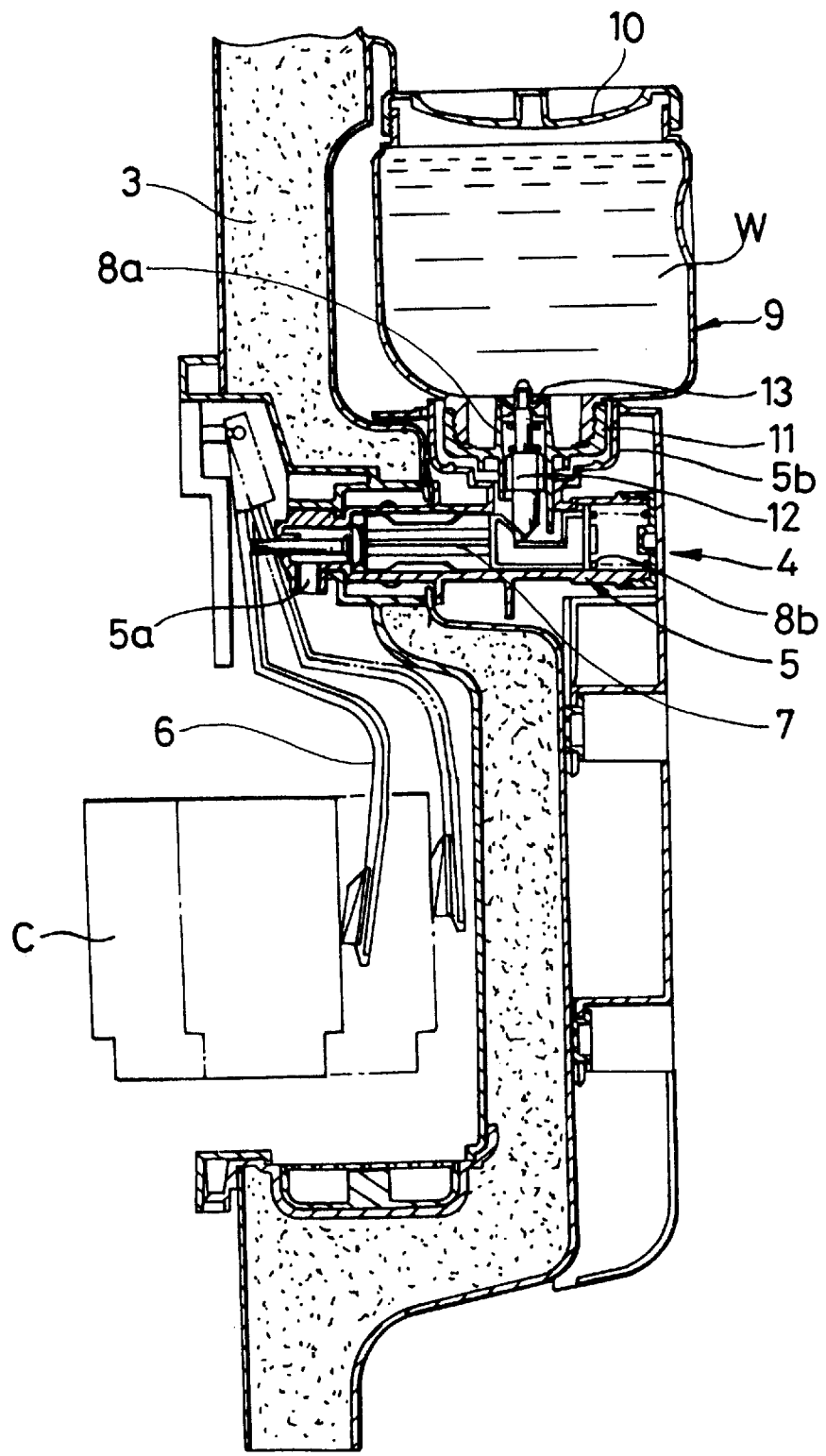
FIG. 2 is a sectional view illustrating a conventional water filling apparatus for a refrigerator.
Figure 3:
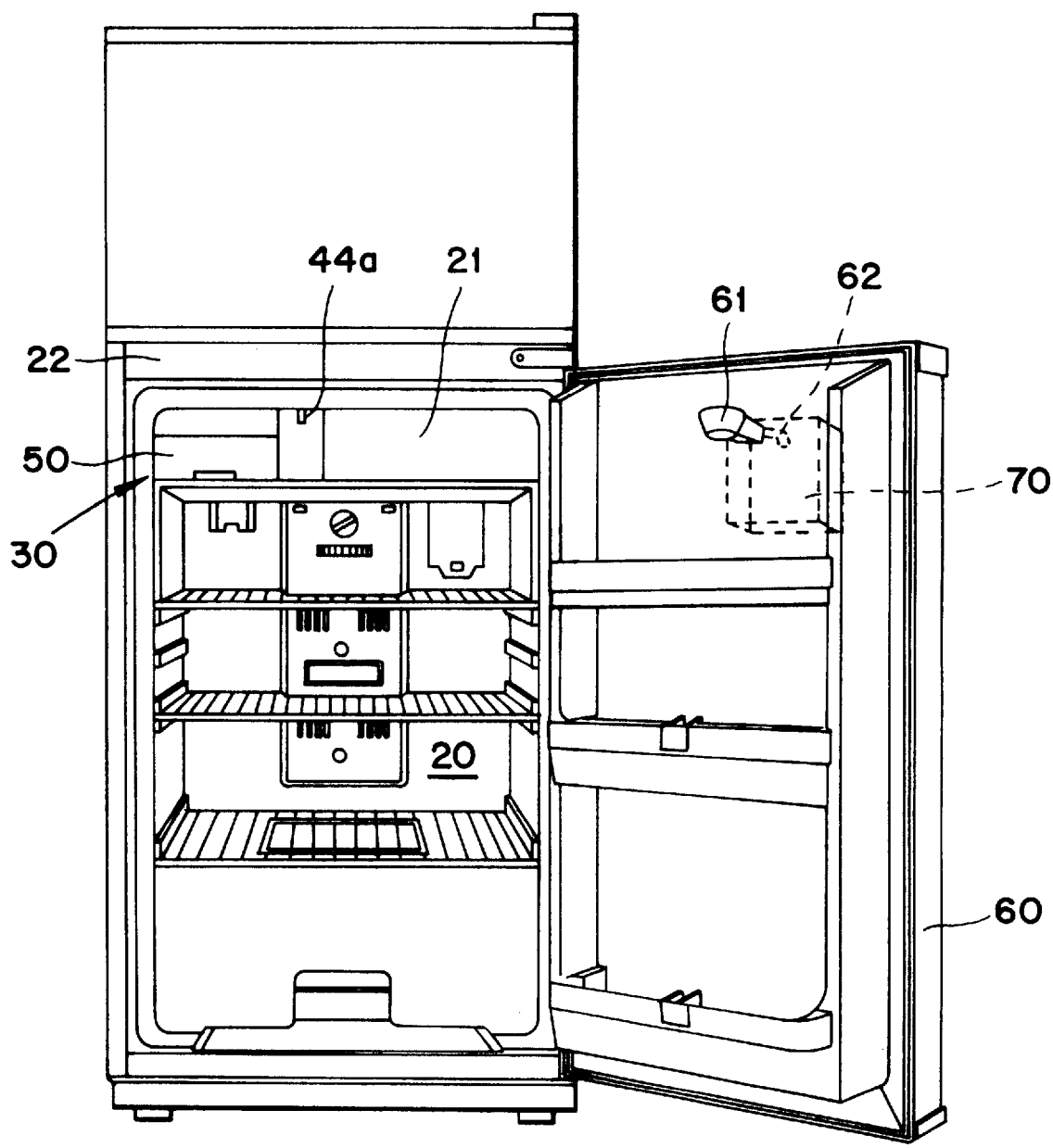
FIG. 3 is a front view illustrating a refrigerator having a water filling apparatus according to the present invention.

FIG. 3 is a perspective view showing a refrigerating compartment of the refrigerator having a water filling apparatus according to the present invention. The water filling apparatus according to the present invention has a water receptacle 50 placed in a space 30 formed by partially partitioning the refrigerating compartment 20 which maintains the temperature just above the freezing point for foodstuffs. The space 30, sometimes called a dedicated cooling chamber is maintained at a relatively lower temperature than the refrigerating compartment 20. The space 30 is thereinafter referred to as a receptacle receiving chamber). The receptacle receiving chamber 30 has an entrance provided at the predetermined position thereof with a projection 31 (see FIG. 4) which allows the received receptacle to be retained in place. A horizontal separate wall 22 isolating the freezing compartment from the refrigerating compartment 20 a first discharge duct 44 which is connected to the discharge outlet of a motor pump 43 outwardly extended free end 44a.

The interior of the refrigerating compartment door 60 is provided with a water collecting cone 61 which is to be positioned below the free end 44a of the first discharge duct 44 when the refrigerating compartment door 60 is closed. The exterior of the refrigerating compartment door 60 has a water dispensing recess 70 communicating with the water collecting cone 61 by means of a second discharge tube 62 extending through the refrigerating compartment door 60.

Figure 4:
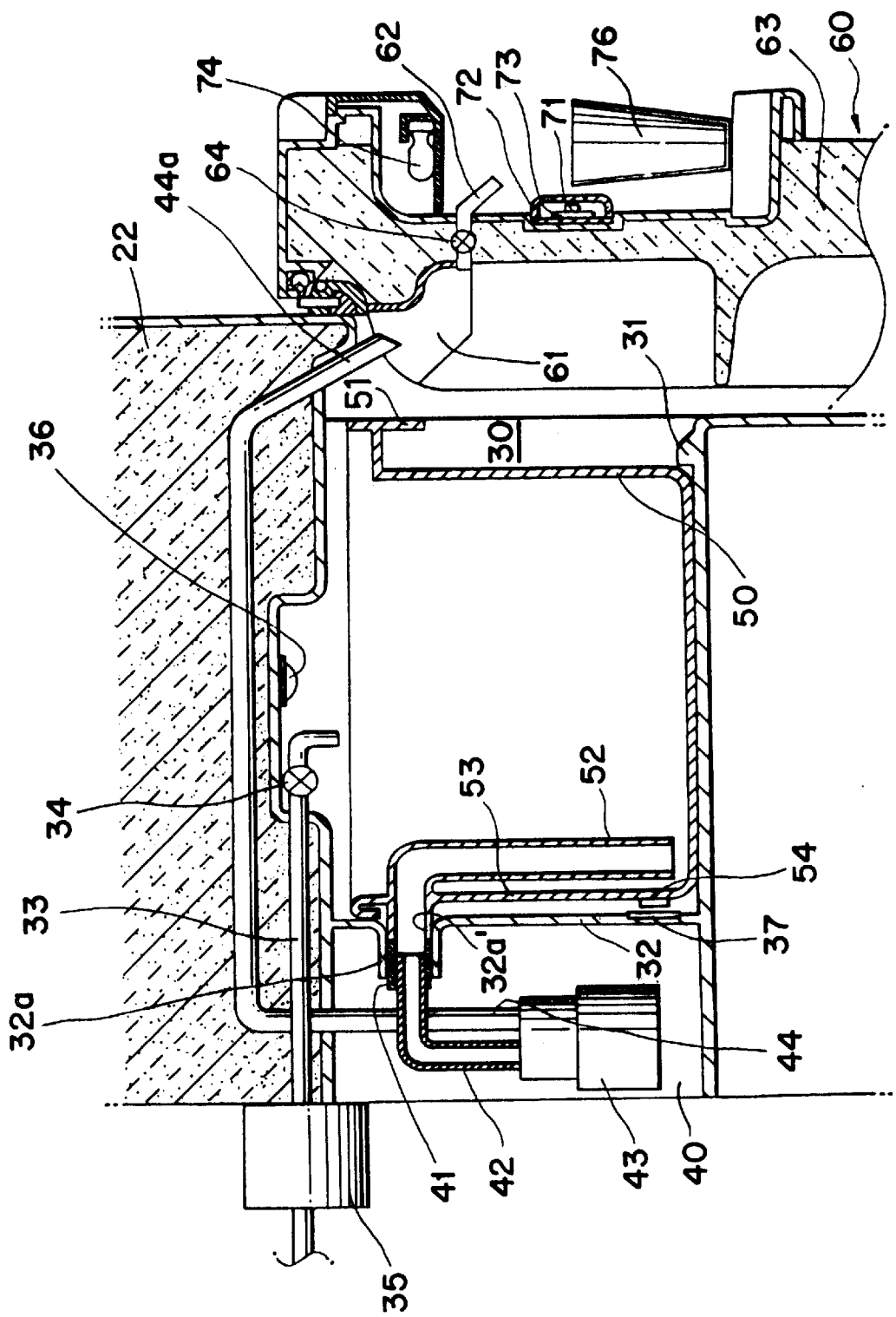
FIG. 4 is a schematic sectional view showing a water filling apparatus according to the present invention closed.

FIG. 4 shows the door of the refrigerator closed. As shown in FIG. 4, the generally box-shaped water receptacle 50 of the water filling apparatus has its top opened, and is configured to slide into the receptacle receiving chamber 30. A rear wall 53 of the water receptacle 50 is provided with an intake duct 52 thereon having one end outwardly extended from the water receptacle 50 and over the rear wall 53 and another end extended to a bottom of the water receptacle 50 along the rear wall 53. Preferably, the intake duct 52 is formed integrally with the water receptacle 50.

Meanwhile, the receptacle receiving chamber 30 has a water discharge mechanical chamber 40 formed therein by a vertical wall 32 at the rear of the receptacle receiving chamber 30. And, on an upper portion of the vertical wall, is formed a connecting portion 32a projected towards the water discharge mechanical chamber 40. When the water receptacle 50 is seated in place within the receptacle receiving chamber 30, the intake duct 52 is closely fitted to the connecting portion 32a by forcedly inserting an and 32a' of the duck 52 into an outer end 32a' of duck 52. Between, an inner circumference of the connecting portion 32a and an outer circumference of the intake duct 52 there is preferably disclosed a suitable packing member(not shown) to prevent leakage of the cold water. The rear wall 53 of the water receptacle 50 has at its predetermined position a permanent magnet 54 causing its magnetic force to close(or open) a lead contacting piece 37, which is installed at a position facing the permanent magnet 54 when the water receptacle 50 is properly seated within the receptacle receiving chamber 30. One may employ a microswitch as a water receptacle detecting sensor. Within the discharge mechanical chamber 40 there is installed a water discharge mechanism in the form of a motor pump 43 having an inlet connected to an inlet duct 42, which is disposed in the connecting portion 32a. A first discharge duct 44 connected to the discharge outlet of the motor pump 43 passes through the wall 22, and the free end 44a of the first discharge duct 44 is positioned at an upper portion of the water collecting cone 61.

Over an upper portion of the receptacle receiving chamber 30, is disposed a water supply duct 33 having a water main (not shown) and another end to which a solenoid valve 34 is installed. Furthermore, the water supply duct 33 communicates with a water purifier for filtering foreign substances contained in the fresh water. Also, over the upper portion of the receptacle receiving chamber 30 is positioned a water level detecting sensor 36 for detecting the level of the cold water stored in the water receptacle 50. Preferably, a non-contact type of sensor may be used as the water level detecting sensor 36, e.g., an ultrasonic sensor can be employed for emitting an ultrasonic wave at certain time intervals, measuring the time duration until the reflected signal from the surface of the cold water is received, and deriving the water level based upon the measured time duration.

As mentioned above, the interior of the refrigerating compartment door 60 has the water collecting cone 61, which is also positioned below the free end 44a first discharge duct 44 of the and serves to collect the cold water dropping through the first discharge duct 44. An outlet of the water collecting cone 61 is connected to a second discharge duct 62 which extends through an insulating wall 63 of the refrigerating compartment door 60 and into the water dispensing space 70. A solenoid valve 64 positioned in the second discharge duct 62 as a closing/opening member serves to prevent the external warm air from entering the refrigerating compartment 20 when the water filling apparatus work is inactive. The water dispensing space 70 has on its rear surface a water feeding switch 71 fixedly supported on an auxiliary circuit board 73 which is seperate from a main circuit board(not shown), which functions to be closed when an external pressure is applied thereto, thereby supplying a power to the motor pump 43. The water feeding switch 71 is covered with protection such as soft rubber, to guard against the entry of water or foreign substances possibly causing the water feeding switch 71 to be ON. Also, the water dispensing space 70 has at its upper portion an illumination lamp 74, such that the space 70 can be viewed at night. In the drawing, reference numeral 51 denotes a handle of the water receptacle 50, and 76 denotes a cup.

FIG. 5 is a block diagram showing a control circuit for the water filling apparatus for the refrigerator. As shown in FIG. 5, a control circuit of the water filling apparatus for the refrigerator includes a control unit 100 for controlling a general operation of the water filling apparatus, a water feeding switching unit 102 for applying a water feed request to the control unit 100, a door closing/opening detecting unit 104 for detecting the closed or opened state of the refrigerating compartment door 60, a water level detecting unit 106 for detecting a water level of the cold water stored in the water receptacle 50, a receptacle detecting unit 112 for detecting whether or not the water receptacle is placed in position, a pump motor driving unit 108 for driving the motor pump 43, and a solenoid valve driving unit 110 for driving the solenoid valve 64 for controlling flow of the fresh water from the water main.

The control unit 100 preferably may comprise a microprocessor. The water feeding switching unit 102 is defined by the water feeding switch 71 and peripheral circuit components associated therewith. The door closing/opening detection unit 104 may be composed of door closing/opening sensing devices included in a conventional refrigerator. Each of the water level detecting unit 106 and the placed receptacle detecting unit 112 may comprise the afore-described water level detecting sensor 36 and the lead contacting piece 37. The control unit 100 may control, although not shown, the illumination lamp 74 and the solenoid valve 64 for blocking the external air.

The operation and advantages of the present invention will now be described in detail in accordance with the accompanying drawings.

The water receptacle 50 cleaned up by the user may be pushed into the receptacle receiving chamber 30 allowing the intake inlet 52 to be coupled to the connecting portion 32a at the vertical wall. At this time, the permanent magnet 54 closes the lead contacting piece 37, such that the control unit 100 is informed that the water receptacle 50 is placed in position within the receptacle receiving chamber 30. The control unit 100 confirms the placement of the water receptacle 50 in position, and then opens the solenoid valve 34 to supply the tap water to the water receptacle 50. In this manner, the water receptacle 50 can be filled with the tap water, with the water level detecting sensor 36 serving to detect the water level the predetermined intervals, and to provide the acquired information with the control unit 100. Based upon the received signal from the water level detecting sensor 36, the control unit 100 performs the determination of the water level, and closes the solenoid valve 34 when the water level reaches the predetermined level.

When the filled water in the water receptacle 50 has been cooled, the user may press the water feeding switch 71. Then, the control unit 100 receives the signal from the water feeding switch 71 and activates the pump motor 43 to discharge the cold water. The discharge of the cold water may be effected by way of a sequential route as follows: intake inlet 52→inlet duct 42→motor pump 43→first discharge duct 44→water collecting cone 61→second discharge duct 62. As the discharge of the cold water is repeated, the water level of the water receptacle 50 may be lowered below the predetermined level. The control unit 100 confirms this occurrence through the water level detecting sensor 36, and then activates the solenoid valve 34 to fill the water receptacle with the purified tap water.

Although the present invention has been described in the context of a water filling apparatus for the refrigerator, one of ordinary skill in the art will recognize that the present invention may also be applied to means for supplying a defrosting water for use in the defroster for the refrigerator.

As described above, the water level of the cold water stored in the water receptacle can be detected and automatically filled as necessary. Therefore, the water filling apparatus of the present invention is able to always supply the cold water without filling of the tab water manually by the user, and without the leakage of the cold air.

What is claimed is:

1. A refrigerator comprising:

a refrigerating compartment;

a water receptacle removably disposed within the refrigerating compartment and communicating with a water dispenser;

a water level detector for detecting a level of water within the receptacle;

a fresh water feed duct extending into the refrigerator for conducting fresh water to the receptacle;

a valve in the fresh water feed duct;

a controller connected to the water level detector and the valve for opening the valve in response to the detected water level falling below a predetermined level, for conducting fresh water to the receptacle; and a receptacle detecting device for detecting the presence of the water receptacle within the refrigerating compartment.

2. The refrigerator as defined in claim 1, wherein the water level detector comprises a non-contact type of sensor for detecting the water level without contacting the water.

3. The refrigerator as defined in claim 1, wherein the water level detector comprises an ultrasonic sensor.

4. The refrigerator as defined in claim 1, wherein the water feed duct communicates with a purifier for filtering foreign substances from the fresh water.

5. The apparatus as defined in claim 1, wherein the controller is operable to close the valve in response to the detected water level reaching an upper limiting level.

6. The apparatus as defined in claim 1, wherein the controller is connected to the receptacle detecting device, the controller being responsive to a signal from the receptacle detecting device to open the valve only when the water receptacle is present.

7. The apparatus as defined in claim 1, further comprising a dedicated cooling chamber disposed within the refrigerating compartment and being of a lower temperature than the refrigerating compartment, the receptacle being disposed in the cooling chamber.

* * * * *